June 14, 1927.
C. M. ANDERSON
LANTERN
Filed April 8, 1926
1,632,577
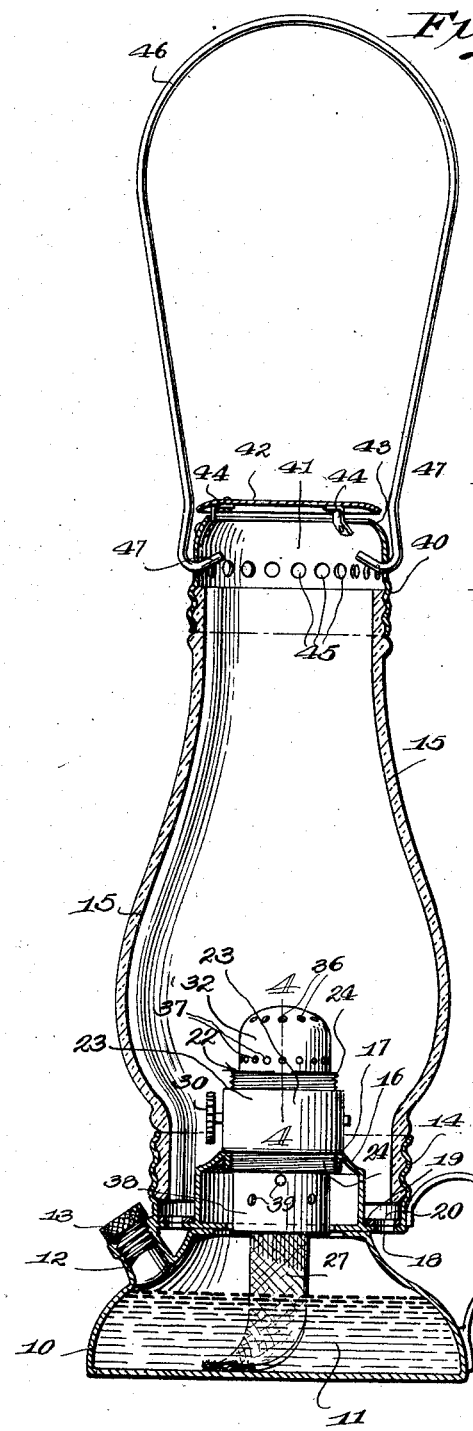
Inventor
Claude M. Anderson
By
Attorney Patented June 14, 1927.

1,632,577

UNITED STATES PATENT OFFICE.

CLAUDE MELBOURNE ANDERSON, OF GUYS HILL, JAMAICA, BRITISH WEST INDIES.

LANTERN.

Application filed April 8, 1926. Serial No. 100,579.

The present invention relates to a lantern and aims to provide a novel and improved device of this character which can also be used conveniently and efficiently as a lamp or candle holder, said device being adapted to burn oil when used as a lantern or lamp and a candle when used as a candle holder.

Another object of the invention is the provision of a tubular reversible burner having a wick which is brought into use when the device is used as a lantern or lamp, said burner when reversed providing an unstanding tubular cup or socket for receiving the lower end of a candle so as to permit the device to be efficiently used as a candle holder.

A further object of the invention is to provide a burner support having a series of apertures therein arranged around the burner so as to serve as wax or tallow vents for escapement of melted wax or tallow when the device is used as a candle holder, and an operable windshield for closing or partially closing said apertures against action of wind when the device is used as a lantern or lamp.

A still further object of the invention is the provision of a top or smoke cap detachably arranged on the top of the chimney with an annular opening and a series of small openings therein to act as a smoke flue for escapement of combustion refuse when the device is used as a lantern or even as a lamp, said annular openings being arranged so as to minimize the action of wind and rain against the burning flame.

Another object of the invention is to provide a slotted dome-shaped burner cap for attachment to the burner, said cap having arranged therein a series of small perforations therearound at its top to serve as gas vents, and another series of perforations arranged therein and therearound at its lower portion for permitting escapement of damp or heavy gases from the oil which accumulates around the base of the cap.

A further object of the invention is the provision of a tubular cup-shaped socket arranged on the burner which may be moved to operative position by reversing the burner so as to receive the lower end of a candle, said cup-shaped tubular socket having arranged in the cylindrical wall thereof a number of small holes that act as oil vents for rapid escapement of melted tallow or wax from the bottom of the socket, which will minimize the accumulation of any melted tallow or wax that may escape into the nozzle of the burner.

It is also an object of the invention to provide a device of the above indicated character, which is compact, simple in construction, easily carried, durable and efficient for the purposes intended, and which can be manufactured economically and of a substantial construction.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a longitudinal section through my improved device, showing the same for use as a lantern, Figure 2 is a similar view of the lower portion, showing the burner reversed with a candle arranged therein, Figure 3 is a top plan of the lower portion of the device with the chimney and flue cap removed, Figure 4 is a fragmentary section taken on line 4—4 of Figure 1, and Figure 5 is a bottom plan of the smoke cap.

In carrying out the invention, the numeral 10 designates the base or bottom which is fitted with an oil reservoir 11. At one side of the base 10 is a nipple 12 for permitting the supplying of fuel to the reservoir, said nipple being normally closed by a threaded cap 13. At the upper portion of the base above the reservoir 11 is arranged a cup-shaped portion 14 provided with coarse threads in its cylindrical wall for threadedly receiving the lower portion of a chimney 15. Arranged centrally in the cup-shaped portion 14 and extending upwardly is a burner socket 16, provided with internal screw threads 17 to be engaged by threads on the burner. The cup-shaped portion 14 is relatively larger than the upper portion of the fuel reservoir so that said cup-shaped portion protrudes beyond the upper periphery portion of the reservoir. In the bottom wall of the cup-shaped portion 14 beyond the periphery of the burner socket 16 and the periphery of the upper portion of the fuel reservoir are provided a series of openings 18, the purpose of which will be set forth as the description proceeds. In order that the openings 18 may be closed or partially closed a flat annular ring 19 provided with a series of openings 20 therein is arranged in the lower portion of the cup-shaped member 14 beyond the periphery of the burner socket 16 for turning movement about said burner socket 16. A handle 21 is secured to the base 10 at the lower portion of the reservoir 11 and at the periphery of the cup-shaped portion 14 in order that the device may be lifted when used as a lamp or candle holder.

The burner 22 arranged in the burner socket 16 is of a tubular reversible type, having a central portion 23 with screw threaded portions 24 at each end thereof, which are adapted to engage the threads 17 arranged on the burner socket 16. The burner frame 22 is closed at each end of the screw threaded portions 24, as at 25, said closed end portions having a flat nozzle 26 extending therethrough for holding a wick 27. The usual cog wheels 28 arranged upon a shaft 29 and operated by a handle 30 are provided for feeding the wick either upwardly or downwardly in the flat nozzle 26. The flat nozzle 26 protrudes slightly beyond one of the end plates 25 of the burner structure, as at 31, for properly supporting the lighting end of the wick 27, said wick 27 having its opposite end extending downwardly through the opposite end plate 25 of the burner structure and into the fuel reservoir. Arranged on the end plate 25 through which the nozzle 26 protrudes is a burner cap 32, said cap being detachably connected to the end plate 25 of the burner structure by providing a pair of small slots 33 in said end plate for receiving small lugs 34 arranged upon the burner cap. The burner cap 32 is slotted in its upper portion, as at 35, for permitting flames from the burning wick to pass therethrough. The top of the burner cap is perforated with a row of small holes 36 to serve as gas vents for escapement of heated gas from within the cap, and another row of similar holes 37 is arranged around the lower part of said burner cap to provide for the escapment of damp or heavy gases which accumulate around the bottom or base of the cap.

On the opposite end plate 25 of the burner frame is arranged a tubular cup-shaped socket 38 to serve as a socket for receiving the lower end of a candle when the burner frame is arranged in the burner socket with the tubular cup-shaped portion 38 extending upwardly. Around the cylindrical portion of said candle receiving socket are a number of small apertures 39 arranged in two rows so as to act as oil vents for rapid escapement of melted tallow or wax from the bottom of the candle socket, which will eliminate to a great extent accumulation of any melted tallow or wax around the nozzle of the burner. By reversing the burner frame structure in the burner socket, that is, arranging the candle socket to extend upwardly and removing the chimney 15, the lower portion of my improved device may be efficiently used as a candle holder or candle stick.

The glass chimney or shade 15 is constructed of thick glass with coarse threads at both ends, the threads at the lower end to engage in the threads of the cup-shaped portion 14, while the threads at the upper end engage in a smoke cap 40. The smoke cap 40 is constructed of two sections, namely a rim section 41 that threadedly engages the chimney and a disk-shaped bonnet or top plate 42, which is raised or spaced slightly above the upper edge of the rim section to provide a smoke flue around the cap for the escapement of combustion refuse. The upper edge of the rim section is bent slightly inwardly, as at 43, while the bonnet or plate section 42 is bent slightly downwardly at its periphery so as to minimize the action of wind and rain against the flame from the burner. The bonnet or top plate 42 is secured to the rim section 41 by a series of angled brackets 44 riveted to both said bonnet and rim section. Around the rim section above the threads that engage the chimney are a number of small holes 45 that act as flues for the escapement of the heated and smoky air within the chimney.

A loop handle 46 is provided so that the device may be used as a lantern, said loop handle being bent from a piece of wire and provided at each end with a hook 47 for engaging into opposite holes 45 in the rim of the smoke shaft. The looped handle 46 is made long enough and so bent and shaped to allow it to rest flat against the sides of the chimney when the device is set down or arranged to be carried or packed. By removing the smoke cap and consequently the loop-shaped handle, the other parts of my device will change the lantern into a small hand lamp.

When the device is used as a lantern, the structure remains assembled as illustrated in Figure 1 of the official drawings, the handle 46 permitting the device to be carried in the usual manner. When used as a lantern, the wind shield 19 is turned so as to close the openings 20 in the bottom of the cup-shaped portion 14 so as to prevent the flames from being extinguished by wind. When the device is used as a lamp the smoke cap 40 and looped handle 46 are disconnected from the chimney and the lamp may be easily carried by the handle 21 arranged upon the base section 10. When it is desired for the device to be used as a candle holder, the burner frame 22 is unthreaded from the burner socket and reversed so that the threads 24 at the opposite end portion of the burner section are threaded into the burner socket, which will arrange the tubular candle socket in an upstanding position. By turning the hand-engaging portion 30, the wick may be moved so as not to interfere with the insertion of a candle in the tubular socket 38. When used as a candle holder, the openings 18 in the bottom of the cup-shaped portion 14 are opened by aligning the openings 20 in the movable flat ring section 19 with said openings 18. This will permit air to enter as well as permit melted wax or tallow to escape from the cup-shaped portion 14. It is to be understood that when the device is used as a candle holder that an ordinary candle is used as the illuminating medium, and that when used as a lamp or lantern, coal oil or similar fuel may be used for the illuminating purpose.

As before mentioned, the small openings or perforations in the burner cap at the top thereof will permit the escapement of heated gas from within the cap and the row of small perforations at the lower portion of the cap will provide for the escapement of damp and heavy gases from oil which naturally accumulates around the lower portion of the cap.

This device will provide a practical and efficient pocket lantern, which is small and compact enough to be readily carried in a coat or jacket pocket while completely equipped for illumination, but at the same time possessing the necessary qualifications of a useful and reliable hand illuminating device. The device is so constructed as to be easily manipulated and all the principal parts can be readily taken apart and cleaned, reversed, adjusted, or assembled in a very short time and with the least amount of labor.

Having thus described my invention, what I claim as new is:

1. A device of the character described comprising a base section, a fuel reservoir arranged in said base section, a burner, a wick carried by said burner, means arranged on said base section for supporting said burner so that the wick thereof extends into the reservoir, said burner having means arranged thereon for supporting a candle, and means arranged on said burner for reversing the same in order that the wick may be illuminated or a candle may be supported thereby.

2. A device of the character described comprising a base section, a fuel reservoir arranged in said base section, a burner, a wick arranged in said burner, means arranged upon said base section for supporting said burner so that the wick therein extends into the reservoir, said burner having a socket arranged at its end opposite to that where the wick is ignited so that a candle may be inserted in said socket upon reversing the position of said burner in its supporting means.

3. A device of the character described comprising a base section, a fuel reservoir arranged in said base section, a burner, a wick arranged in said burner, said burner having a socket arranged at its end opposite to that where the wick is ignited, said base section having an interiorly threaded opening therein, and threads arranged on said burner so that the same may be supported by the base section with the wick extending into the reservoir or reversely threaded so that the socket may be arranged above for supporting a candle.

4. A device of the character described comprising a base section, a fuel reservoir arranged in said base section, a burner, a wick arranged in said burner, means for supporting said burner so that the wick thereof extends into the reservoir, means arranged upon said burner for supporting a candle, means arranged upon said burner for reversing the position thereof in order that the same may support a candle, a cup-shaped section arranged upon said base section, a chimney supported by said cup-shaped section, said cup-shaped section having openings therein, and means for opening and closing said openings.

5. A device of the character described comprising a base section, a fuel reservoir arranged in said base section, a burner, a wick arranged in said burner, means for supporting said burner so that the wick thereof extends into the reservoir, means arranged upon said burner for supporting a candle, means arranged upon said burner for reversing the position thereof in order that the same may support a candle, a cup-shaped section arranged upon said base section, a chimney supported by said cup-shaped section, said cup-shaped section having openings therein, a member positioned in said cup-shaped section and having openings therein for aligning with the openings in said cup-shaped section for opening and closing said openings in said cup-shaped section.

In testimony whereof, I have affixed my signature.

CLAUDE M. ANDERSON.